(12) United States Patent
Kim et al.

(10) Patent No.: US 6,268,087 B1
(45) Date of Patent: Jul. 31, 2001

(54) METHOD OF PREPARING LITHIUM ION POLYMER BATTERY

(75) Inventors: Dong-Won Kim; Young-Roak Kim; Yang-Kook Sun; Boo-Keun Oh, all of Taejeon; Chang-Woo Baek, Taegu, all of (KR)

(73) Assignee: Samsung Display Device Co., Ltd. (KR)

( * ) Notice: Subject to any disclaimer, the term of this patent is extended or adjusted under 35 U.S.C. 154(b) by 0 days.

(21) Appl. No.: 09/126,487

(22) Filed: Jul. 30, 1998

(30) Foreign Application Priority Data

Aug. 16, 1997 (KR) .................................................. 97-39079

(51) Int. Cl.⁷ ..................................................... H01M 4/60
(52) U.S. Cl. ...................................... 429/231.95; 429/129
(58) Field of Search ........................... 429/231.8, 231.95, 429/129, 134

(56) References Cited

U.S. PATENT DOCUMENTS

| | | | |
|---|---|---|---|
| 5,491,041 | 2/1996 | Abraham et al. .................... | 429/212 |
| 5,540,741 | 7/1996 | Gozdz et al. ........................ | 429/192 |
| 5,894,656 * | 4/1999 | Menon et al. ....................... | 29/623.1 |
| 5,928,391 * | 7/1999 | Lewin ................................. | 29/623.5 |
| 6,020,087 * | 2/2000 | Gao ..................................... | 429/188 |

* cited by examiner

Primary Examiner—Gabrielle Brouillette
Assistant Examiner—M. Wills
(74) Attorney, Agent, or Firm—Woodcock Washburn Kurtz Mackiewicz & Norris LLP

(57) ABSTRACT

The present invention relates to a method of preparing a lithium ion polymer battery which has a high capacity and a good cyclability as well as no exudation of liquid electrolyte. The lithium ion polymer battery according to the present invention is prepared by the steps of forming electrode films, laminating the electrode films on both surfaces of a grid or extended metal so as to improve the interfacial adhesion between the electrode films, forming a polymer electrolyte film composed of a polymer, an electrolyte solution, and a filler, and laminating the composite anode, the polymer electrolyte and the composite cathode. The activated composite anode/polymer electrolyte film/activated composite cathode is laminated to obtain a lithium ion polymer battery structure. The lithium ion polymer battery is vacuum-packaged using a vacuum packaging apparatus.

7 Claims, 3 Drawing Sheets

METHOD OF PREPARING LITHIUM ION POLYMER BATTERY

FIELD OF THE INVENTION

The present invention relates to a method of preparing a lithium ion polymer battery which has high energy density and good cyclability. More particularly, the present invention relates to a method of preparing a lithium ion polymer battery composed of a carbon composite anode, a polymer electrolyte and a metallic oxide composite cathode, which prevents the exudation of liquid electrolyte by using a polymer matrix highly compatible with liquid electrolyte and improves interfacial adhesion between an electrolyte and electrodes.

BACKGROUND OF THE INVENTION

The lithium ion polymer batteries fabricated with a solid polymer electrolyte having a high ionic conductivity have advantages to solve the problems of the exudation of electrolyte solution and explosion, which have occurred in the lithium ion cell using liquid electrolyte. Also, if a solid polymer electrolyte is employed, it is possible to design various shapes of cell as well as to simplify the process of manufacturing the lithium ion polymer batteries. Since the lithium ion polymer battery has little self-discharge up to 5% and no memory effect, it is spotlighted as a next generation battery. A method of preparing a lithium ion polymer battery has been developed in many ways.

U.S. Pat. No. 5,491,041 discloses a solid state rechargeable electrochemical cell comprising a Li intercalating composite cathode, a solid polymer electrolyte separator, and a composite anode containing graphite, a polymer electrolyte and 12-crown-4-ether. The electrodes of the U.S. patent above are prepared by coating a current collector layer such as aluminium or copper foil with a cathode or an anode active material. However, the cell has a poor cyclability due to being separated the active material from the current collector layer during charge/discharge cycles. Further, the capacity of the cell per unit area cannot be increased due to the limitation to the thickness of electrodes.

U.S. Pat. No. 5,540,741 discloses a method of making a battery structure comprising forming a solid state positive electrode of a polymer, a plasticizer and an active material, forming a solid state negative electrode of the same polymer, a plasticizer and an active material, forming a separator membrane of the same polymer and a plasticizer, bonding said electrodes and said separator membrane to form a unitary cell structure, extracting a portion of said plasticizer from at least said separator membrane, and activating said battery by reswelling at least said separator membrane by contacting said unitary battery structure with an electrolytic salt solution. This method of the patent has an advantage that most of the steps for preparing the battery structure can be carried out under the atmosphere so as to avoid using an electrolyte solution which is sensitive to the moisture, and that the activating step is carried out under the anhydrous atmosphere. However, the battery prepared by the method has an exudation problem of liquid electrolyte, because the polymer electrolyte does not retain the liquid electrolyte for a long period. Also, it is not easy to retain a sufficient amount of the liquid electrolyte in the microporous polymer membrane.

Therefore, the present inventors have developed a lithium ion polymer battery to overcome the shortcomings of the conventional batteries and a method of preparing the same.

OBJECTS OF THE INVENTION

An object of the present invention is to provide a method of preparing a lithium ion polymer battery which can prevent the exudation of liquid electrolyte.

Another object of the invention is to provide a method of preparing a lithium ion polymer battery which has a high capacity.

A further object of the invention is to provide a method of preparing a lithium ion polymer battery which has a good cyclability.

Other objects and advantages of this invention will be apparent from the ensuing disclosure and appended claims.

SUMMARY OF THE INVENTION

The present invention relates to a method of preparing a lithium ion polymer battery which has a high capacity and a good cyclability as well as no exudation of liquid electrolyte. The lithium ion polymer battery according to the present invention is prepared by the steps of forming electrode films, laminating the electrode films on both surfaces of a grid or extended metal so as to improve the interfacial adhesion between the electrode films, forming a polymer electrolyte film composed of a polymer, an electrolyte solution, and a filler, and laminating the composite anode, the polymer electrolyte and the composite cathode.

The lithium ion polymer battery according to the present invention comprises a carbon composite anode, a polymer electrolyte and a metallic oxide composite cathode.

The composite anode is prepared by forming an anode film by casting a composite anode slurry composed of an active material, a conducting material, a binder, a plasticizer and a solvent, laminating said anode film on both sides of a copper grid or a copper extended metal to prepare a composite anode, extracting plasticizer from the composite anode by immersing in a solvent, and activating the composite anode by immersing in an electrolyte solution to prepare an activated composite anode.

The polymer electrolyte film is made by casting a polymer electrolyte slurry composed of a polymer matrix, a liquid electrolyte solution of a lithium salt and an aprotic solvent, a filler and a solvent.

The composite cathode is prepared by forming a cathode film by casting a composite cathode slurry composed of an active material, a conducting material, a binder, a plasticizer and a solvent, laminating said cathode film on both sides of an aluminum grid or an aluminum extended metal to prepare a composite cathode, extracting plasticizer from the composite cathode by immersing in a solvent, and activating the composite cathode by immersing in an electrolyte solution to prepare an activated composite cathode.

The activated composite anode/polymer electrolyte film/ activated composite cathode is laminated to obtain a lithium ion polymer battery structure. The lithium ion polymer battery is vacuum-packaged using a vacuum packaging apparatus.

The present invention has an advantage that most of the steps for preparing the battery structure can be carried out under the atmosphere so as to avoid using an electrolyte solution which is sensitive to the moisture, and that the activating step is carried out under the anhydrous atmosphere. Also, this invention is to provide a lithium ion polymer battery having a high capacity and a good cyclability, which can prevent the exudation of liquid electrolyte.

BRIEF DESCRIPTION OF THE DRAWINGS

The present invention will be described with reference to the accompanying drawings of which.

DETAILED DESCRIPTION OF THE PREFERRED EMBODIMENT

Figure 1:
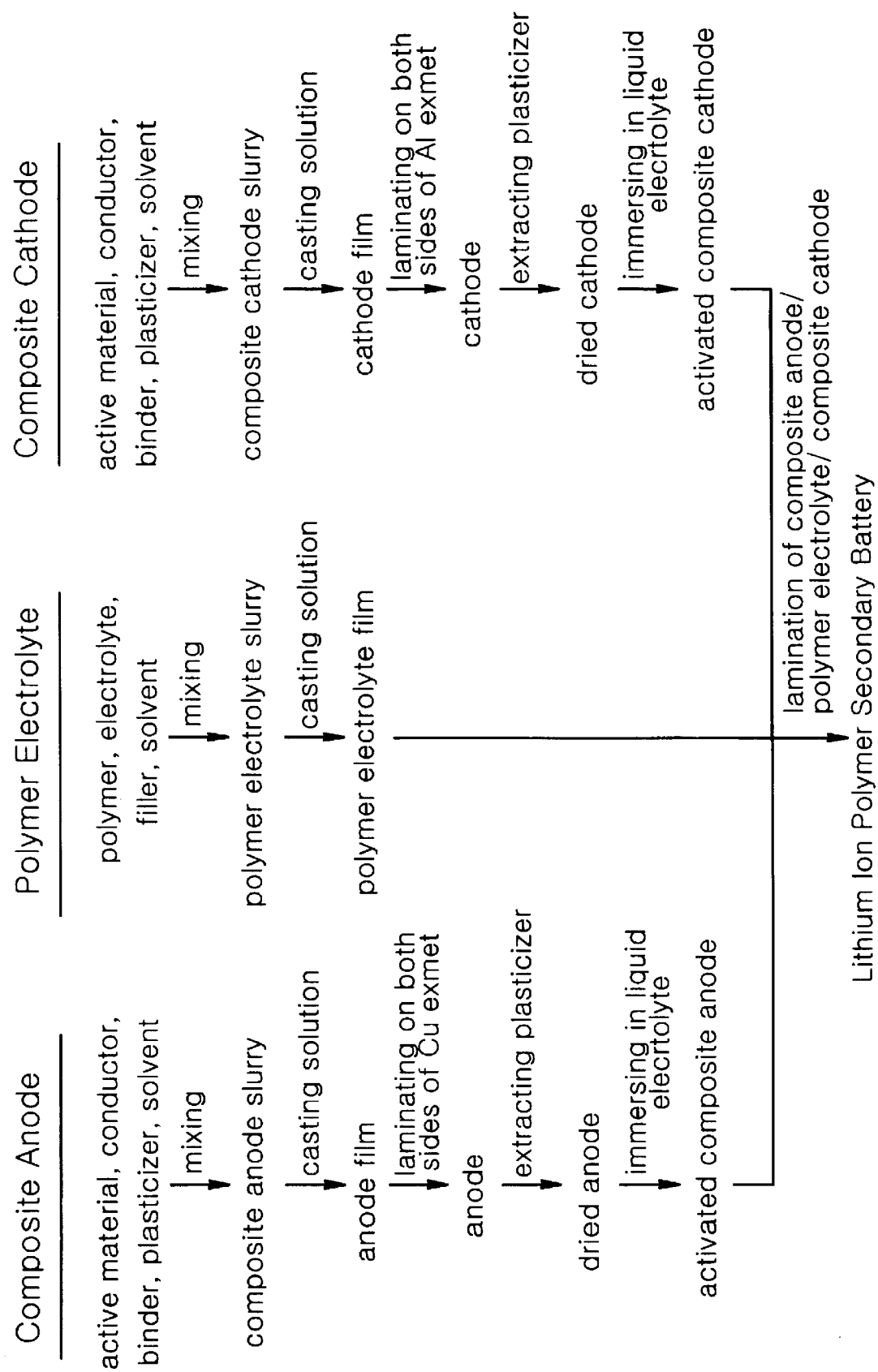
FIG. 1 is a schematic diagram of the preparation process of a lithium ion polymer battery in accordance with the present invention.

The important factors characterizing the performance of a secondary battery are energy density and cycle life. The energy density can be increased by effectively filling active material per unit weight or volume in a battery. The cycle life depends upon not only constituent elements of a battery, but also interfacial contacts between electrode materials.

In this invention, in order to maximize the amount of active material to be loaded in the electrodes, electrode films are prepared by casting a composite electrode slurry composed of an active material, a conducting material, a binder, a plasticizer and a solvent, and each electrode film is laminated under high pressure to prepare a composite electrode. In order to improve the interfacial adhesion of the electrode films, the films are laminated on a metal grid or an extended metal, but not on a metal foil. And, in order to prevent the exudation of liquid electrolyte, a polymer having a good compatibility with liquid electrolyte is employed.

The method of preparing a lithium ion polymer battery in accordance with the present invention comprises processes of preparing a composite anode, a polymer electrolyte and a composite cathode, fabricating a cell from the components, and packaging the cell.

The composite anode is prepared by forming an anode film by casting a composite anode slurry composed of an active material, a conducting material, a binder, a plasticizer and a solvent, laminating said anode film on both sides of a copper grid or a copper extended metal to prepare a composite anode, extracting plasticizer from the composite anode by immersing in a solvent, and activating the composite anode by immersing in an electrolyte solution to prepare an activated composite anode.

The polymer electrolyte film is made by casting a polymer electrolyte slurry composed of a polymer matrix, a liquid electrolyte solution of a lithium salt and an aprotic solvent, a filler and a solvent.

The composite cathode is prepared by forming a cathode film by casting a composite cathode slurry composed of an active material, a conducting material, a binder, a plasticizer and a solvent, laminating said cathode film on both sides of an aluminum grid or an aluminum extended metal to prepare a composite cathode, extracting plasticizer from the composite cathode by immersing in a solvent, and activating the composite cathode by immersing in an electrolyte solution to prepare an activated composite cathode.

The activated composite anode/polymer electrolyte film/activated composite cathode is laminated to obtain a lithium ion polymer battery structure. The lithium ion polymer battery is vacuum-packaged using a vacuum packaging apparatus.

The anode active material used for preparing the composite anode in the present invention is selected from the group consisting of petroleum coke, microbead carbon coke, synthetic graphite, natural graphite and mixtures thereof. The cathode active material used for preparing the composite cathode in the present invention is selected from the group consisting of lithiated manganese tetraoxide ($LiMn_2O_4$), lithiated cobalt dioxide ($LiCoO_2$) and lithiated nickel dioxide ($LiNiO_2$).

Polymer matrices used for preparing the polymer electrolyte according to the present invention are polyacrylonitrile, poly(vinylidene fluoride), poly(methyl methacrylate), poly(ethylene oxide), poly(vinyl chloride), poly(vinyl acetate), polystyrene and copolymers thereof. These polymer matrices have a good compatibility with the liquid electrolyte which is used in this invention. The polymer electrolyte is prepared by mixing a polymer matrix with a liquid electrolyte, adding a ceramic filler to the polymer electrolyte solution, stirring the solution to be completely dissolved, and finally casting the obtained polymer electrolyte solution on a glass plate.

The liquid electrolyte for preparing the polymer electrolyte is composed of a lithium salt and an aprotic solvent. Examples of the lithium salt are lithium perchlorate ($LiClO_4$), lithium trifluoromethansulfonimide ($LiN(CF_3SO_2)$), lithium hexafluorophosphate ($LiPF_6$), lithium tetrafluoroborate ($LiBF_4$), lithium trifluoromethansulfonate ($LiCF_3SO_3$), lithium hexafluoroarsenate ($LiAsF_6$) and mixtures thereof. Examples of the aprotic solvent are ethylene carbonate, propylene carbonate, dimethyl carbonate, diethyl carbonate, diethoxy ethane, dimethoxy ethane, dipropyl carbonate and mixtures thereof.

Ceramic fillers used for preparing the polymer electrolyte are silica, alumina, lithium aluminate, zeolite and mixtures thereof.

As the polymer matrices which have been employed in conventional methods of preparing a lithium ion polymer battery have a poor compatibility with a liquid electrolyte, the polymer matrices could cause the exudation of liquid electrolyte and low interfacial adhesion between electrodes and polymer electrolyte. By contrast, the present invention uses a polymer matrix which has a good compatibility with a liquid electrolyte, so that the interfacial adhesion between electrodes and electrolyte is improved. The lithium ion polymer battery in accordance with the present invention has a high capacity and a good cyclability as well as a safety of battery.

The present invention may be better understood by reference to the following examples which are intended for purposes of illustration and are not to be confined in any way limiting the scope of the present invention, which is defined in the claims appended hereto.

EXAMPLES

FIG. 1 shows a schematic diagram of the preparation method of the lithium ion polymer battery according to the present invention. The method of preparing the lithium ion polymer battery comprises processes of preparing a composite anode, a polymer electrolyte, and a composite cathode, fabricating a cell from the components, and packaging the cell. The detailed description of each process follows as below.

Preparation of Comosite Anode Film

A composite anode slurry for the lithium ion polymer battery was composed of an anode active material, a conducting material, a binder, a plasticizer and a solvent. A synthetic graphite was used as anode active material, and Super P battery carbon was used as conducting material, and poly(vinylidene fluoride-co-hexafluropropylene) was used as binder. The process of preparing a composite anode from the components was shown in FIG. 1. The poly(vinylidene fluoride-co-hexafluropropylene) of 9.3 parts by weight was completely dissolved in acetone, thereafter, dibutyl phthalate of 22.7 parts by weight was added as plasticizer and stirred to give a homogeneous solution. To the solution, 2.6 parts by weight of Super P battery carbon and 65.4 parts by weight of graphite were added, thereby a black anode slurry with a high viscosity being prepared. The slurry was poured on a glass plate and cast with a doctor blade, and then the cast film was exposed to the atmosphere at room temperature for 30 minutes to evaporate acetone, thereafter, to give a composite anode film.

Preparation of Composite Cathode Film

A composite cathode slurry was also composed of a cathode active material, a conducting material, a binder, a plasticizer and a solvent. As cathode active material, $LiMn_2O_4$ was used. Super P battery carbon was used as conducting material, and poly(vinylidene fluoride-co-hexafluropropylene) was used as binder. The process of preparing a composite cathode by using the components is shown in FIG. 1. The poly(vinylidene fluoride-co-hexafluropropylene) of 10.0 parts by weight was completely dissolved in acetone, and dibutyl phthalate of 19.5 parts by weight was added and stirred to give a homogeneous solution. To the solution, 5.5 parts by weight of Super P battery carbon and 65.1 parts by weight of $LiMn_2O_4$ in powder were added and mixed, a cathode slurry being prepared. The slurry was poured on a glass plate and coated with a doctor blade. The coated film was exposed to the atmosphere at room temperature for 30 minutes to give a composite cathode film.

Lamination of Electrodes

The composite anode film and the composite cathode film were layer-built to form electrode/current collector/electrode, to prepare a composite anode and a composite cathode, respectively. The current collector for the composite anode was a copper extended metal and the current collector for the composite cathode was an aluminum extended metal. The layer-built samples were passed through a laminator. The samples were reversed and passed again. This lamination was repeated at least twice. The capacity of graphite used as anode active material was 280 mAh/g, and the capacity of $LiMn_2O_4$ used as cathode active material was 110 mAh/g. For balancing the capacities, the ratio of the anode active material to the cathode active material was kept in the range of 1:2.2~2.3.

Extraction of Plasticizer and Activation of Electrodes

Dibutyl phthalate which had been employed as plasticizer was extracted to form a micropore on the composite anode or cathode. The laminated electrodes were placed in a beaker, and ether was poured therein until the electrode was sunk. The first extraction was carried out over 30 minutes, and the second extraction was repeated in a fresh solvent. The electrodes in which plasticizer was removed were dried in a vacuum oven for 1 hour. After vacuum-drying, the electrodes were immersed in an electrolyte solution. The liquid electrolyte was impregnated into the micropores of the electrodes. The liquid electrolytes having various compositions as shown in the following Examples were used to activate the electrodes. The activation time was longer than 1 hour.

Preparation of Polymer Electrolyte

A terpolymer of 11% by weight, which is composed of acrylonitrile, methyl methacrylate and styrene of 54%, 32%, 14% by mole, respectively, was dissolved in tetrahydrofuran, and a liquid electrolyte of 89% by weight was added. To 100 parts by weight of the electrolyte solution was 6 parts by weight of silica added and the solution was stirred to be completely dissolved. The resultant sticky polymer electrolyte solution was cast on a glass plate. The tetrahydrofuran solvent was completely removed to give a polymer electrolyte.

Preparation and Packaging of Battery

A polymer electrolyte film was sandwiched between an activated composite anode and an activated composite cathode, and the cell was laminated to obtain a lithium ion polymer battery. Finally, the lithium ion polymer battery was vacuum-packaged.

Example 1

Figure 2:
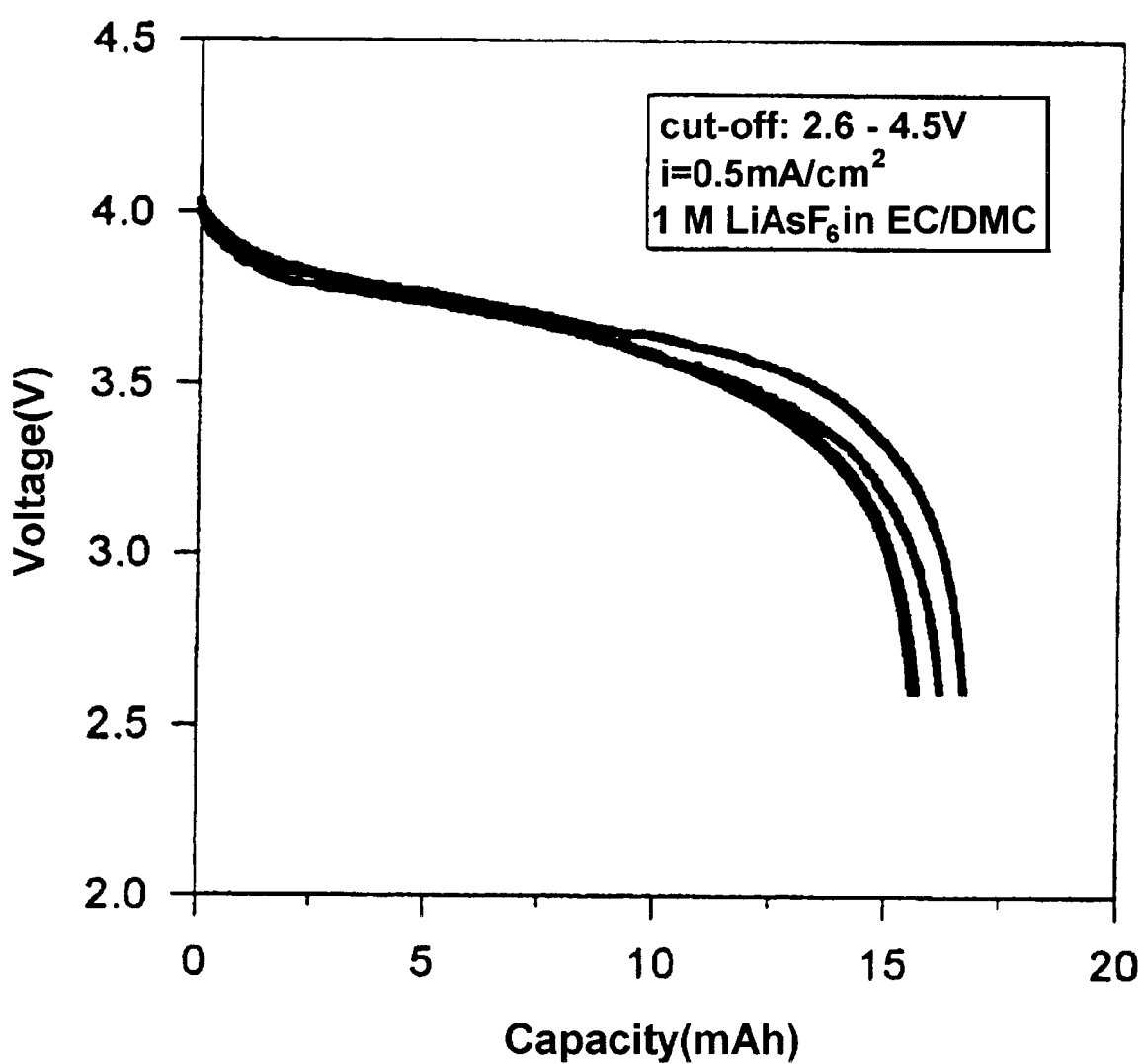
FIG. 2 shows charge/discharge curves for a lithium ion polymer battery composed of a carbon composite anode/polymer electrolyte/metallic oxide composite cathode (electrolyte solution: 1M lithium hexafluoroarsenate, ethylene carbonate/dimethyl carbonate) according to the present invention at a current density of 0.5 mA/cm$^2$.

An electrolyte solution was prepared by dissolving a lithium hexafluoroarsenate ($LiAsF_6$) in the mixture of ethylene carbonate and dimethyl carbonate having the ratio by volume of 2:1, of which concentration was 1 M. A charge/discharge curves as shown in FIG. 2 were obtained by charging/discharging the lithium ion polymer battery at the current density of 0.5 $mA/cm^2$. The average voltage of the cell was about 3.8 V, and the capacity of the cell was 16.2 mAh (4.1 $mAh/cm^2$), and the decrease of capacities depending on charge/discharge cycles was low, which means that the cell has a good cyclability.

Example 2

Figure 3:
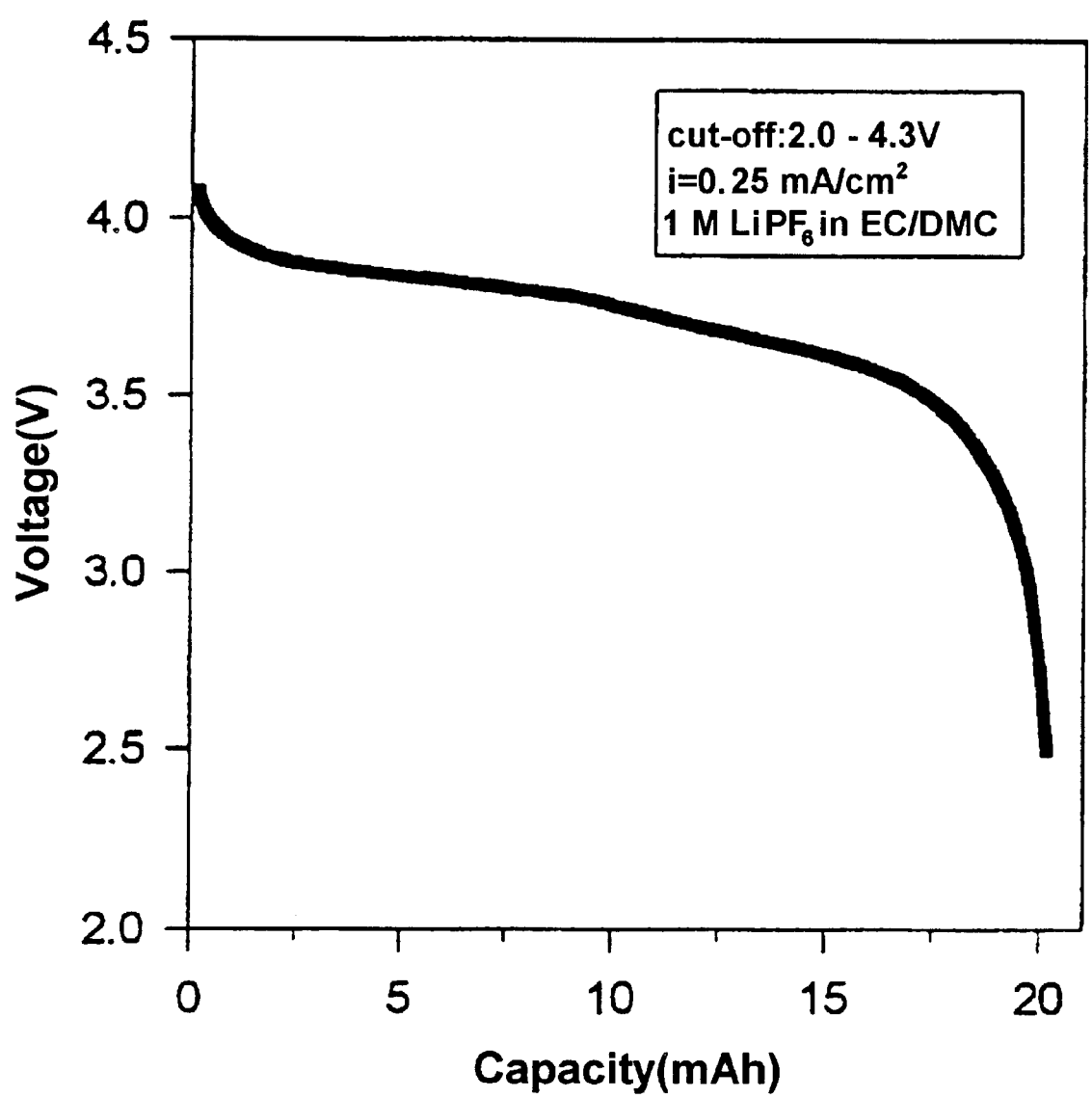
FIG. 3 shows charge/discharge curves for a lithium ion battery composed of a carbon composite anode/polymer electrolyte/metallic oxide composite cathode (electrolyte solution: 1M lithium hexafluorophosphate, ethylene carbonate/dimethyl carbonate) according to the present invention at a current density of 0.25 mA/cm$^2$.

A lithium ion polymer battery was prepared in the same manner as Example 1, except using an electrolyte solution composed of 1 M lithium hexafluorophosphate ($LiPF_6$) and the ethylene carbonate/dimethyl carbonate having the ratio by volume of 2:1. Charge/discharge curves as shown in FIG. 3 were obtained by charging/discharging the lithium ion polymer battery at the current density of 0.25 $mA/cm^2$. The capacity of the cell was 20.1 mAh (5.0 $mAh/cm^2$).

Example 3

A lithium ion polymer battery was prepared in the same manner as Example 1, except using an electrolyte solution composed of 1 M lithium tetrafluoroborate ($LiBF_4$) and the ethylene carbonate/dimethyl carbonate having the ratio by volume of 1:1. By charging/discharging the lithium ion polymer battery at a current density of 0.2 $mA/cm^2$, the capacity of the cell was measured to be 11.9 mAh (3.0 $mAh/cm^2$).

The present invention can be easily carried out by an ordinary skilled person in the art. Many modifications and changes may be deemed to be within the scope of the present invention as defined in the following claims.

What is claimed is:

1. A method for preparing a lithium ion polymer battery comprising:
   a) providing an activated composite anode by
      forming an anode film by casting a composite anode slurry comprising an anode active material, a conducting material, a binder, a plasticizer and a solvent;
      laminating said anode film on both sides of a copper grid or a copper extended metal to prepare a composite anode;
      extracting plasticizer from the composite anode by immersing in a solvent; and
      activating the composite anode by immersing in an electrolyte solution to prepare an activated composite anode;

(b) providing a polymer electrolyte film by
casting a polymer electrolyte slurry comprising a polymer matrix, a liquid electrolyte solution of a lithium salt and an aprotic solvent, a filler and a solvent, and removing the solvent;

(c) providing an activated composite cathode by
forming a cathode film by casting a composite cathode slurry comprising a cathode active material, a conducting material, a binder, a plasticizer and a solvent;
laminating said cathode film on both sides of an aluminum grid or an aluminum extended metal to prepare a composite site cathode;
extracting plasticizer from the composite cathode by immersing in a solvent; and
activating the composite cathode by immersing in an electrolyte solution to prepare an activated composite cathode; and (d) laminating said activated composite anode, polymer electrolyte and activated composite cathode.

2. The method as defined in claim 1 wherein said polymer matrix is selected from the group consisting of polyacrylonitrile, poly(vinylidene fluoride), poly(methyl methacrylate), poly(ethylene oxide), poly(vinyl chloride), poly(vinyl acetate), polystyrene and copolymers thereof.

3. The method as defined in claim 1 wherein said lithium salt is selected from the group consisting of lithium perchlorate ($LiClO_4$), lithium hexafluorophosphate ($LiPF_6$), lithium tetrafluoroborate ($LiBF_4$), lithium trifluoromethansulfonate ($LiCF_3SO_3$), lithium hexafluoroarsenate ($LiAsF_6$) and mixtures thereof.

4. The method as defined in claim 1 wherein said aprotic solvent is selected from the group consisting of ethylene carbonate, propylene carbonate, dimethyl carbonate, diethyl carbonate, diethoxy ethane, dimethoxy ethane, dipropyl carbonate, and mixtures thereof.

5. The method as defined in claim 1 wherein said filler is selected from the group consisting of silica, alumina, lithium aluminate, zeolite and mixtures thereof.

6. The method as defined in claim 1 wherein said cathode active material is selected from the group consisting of $LiMn_2O_4$, $LiCoO_2$ and $LiNiO_2$.

7. The method as defined in claim 1 wherein said anode active material is selected from the group consisting of petroleum coke, microbead carbon coke, synthetic graphite and natural graphite.

* * * * *

UNITED STATES PATENT AND TRADEMARK OFFICE
CERTIFICATE OF CORRECTION

PATENT NO.   : 6,268,087 B1                                              Page 1 of 1
DATED        : July 31, 2001
INVENTOR(S)  : Dong-Won Kim; Young-Roak Kim; Yang-Kook Sun; Boo-Keum Oh and Chang-Woo Baek It is certified that error appears in the above-identified patent and that said Letters Patent is hereby corrected as shown below:

Column 4,
Line 62, change "Comosite" to -- Composite --

Column 6,
Line 56, after "by" insert -- the steps of --

Column 7,
Line 2, "comprising a" should read -- composed of --
Lines 4 and 5, after second occurrence of "solvent" delete -- , and removing the solvent --
Line 6, after "by" insert -- the steps of --
Line 8, "comprising a" should read -- composed of --
Line 12, delete -- site --

Signed and Sealed this

Twenty-fifth Day of December, 2001

Attest:

JAMES E. ROGAN
Attesting Officer        Director of the United States Patent and Trademark Office